US010047955B2

(12) United States Patent
Strobel

(10) Patent No.: US 10,047,955 B2
(45) Date of Patent: Aug. 14, 2018

(54) THERMAL POST-COMBUSTION UNIT

(71) Applicant: Eisenmann SE, Boeblingen (DE)

(72) Inventor: Volker Strobel, Steinenbronn (DE)

(73) Assignee: EISENMANN SE, Boeblingen (DE)

( * ) Notice: Subject to any disclaimer, the term of this patent is extended or adjusted under 35 U.S.C. 154(b) by 98 days.

(21) Appl. No.: 14/963,367

(22) Filed: Dec. 9, 2015

(65) Prior Publication Data

US 2016/0161116 A1    Jun. 9, 2016

(30) Foreign Application Priority Data

Dec. 9, 2014   (DE) .................. 10 2014 018 178

(51) Int. Cl.
*F23D 5/00* (2006.01)
*F23G 7/06* (2006.01)
*F23G 5/12* (2006.01)
*F23L 15/04* (2006.01)

(52) U.S. Cl.
CPC .............. *F23G 7/066* (2013.01); *F23G 5/12* (2013.01); *F23L 15/04* (2013.01); *Y02E 20/348* (2013.01)

(58) Field of Classification Search
CPC .................................................. Y02E 20/348
USPC ............... 431/215, 213, 207, 218, 115, 116; 423/245.3
See application file for complete search history.

(56) References Cited

U.S. PATENT DOCUMENTS

| 4,752,212 A | * | 6/1988 | Breen ................... F23D 14/22 431/215 |
| 4,850,857 A | * | 7/1989 | Obermuller ............ F23G 7/066 422/203 |
| 5,183,646 A | * | 2/1993 | Anderson .............. B01D 53/34 422/173 |
| 5,516,499 A | * | 5/1996 | Pereira ................... F23G 7/07 110/210 |
| 5,609,833 A | * | 3/1997 | R uhl ..................... F23D 14/02 110/210 |
| 5,735,680 A | * | 4/1998 | Henkelmann ......... F28D 21/001 122/511 |
| 9,139,936 B2 | * | 9/2015 | Meinecke ............... F27B 9/28 |

(Continued)

FOREIGN PATENT DOCUMENTS

DE    10 2012 023 257 A    6/2014
DE    10 2013 100 108 A1   7/2014

*Primary Examiner* — Vivek Shirsat
(74) *Attorney, Agent, or Firm* — Schroeder Intellectual Property Law Group, LLC

(57) ABSTRACT

A thermal post-combustion unit with a combustion chamber having a combustion space to which exhaust air can be supplied, having a burner for heating the combustion space, whereby clean air is produced, having an inlet for exhaust air and having an outlet for clean air. A flow path connects the inlet to the combustion space. Exhaust air can be heated by a heat-exchanger system. The flow path comprises a first, second and third flow section, wherein the first flow section is connected to the inlet and the exhaust air flows from the third flow section to the combustion space, wherein the flow sections connect to one another at diversion ends so that the exhaust air flows through two successive flow sections with different flow directions. Heat-exchanger pipes extend at least inside the first and the second flow section or at least the first and the second flow section extend inside heat-exchanger pipes.

8 Claims, 3 Drawing Sheets

(56) References Cited

U.S. PATENT DOCUMENTS 9,194,580 B2 * 11/2015 Gminder ................. F23D 14/24
2014/0147361 A1 * 5/2014 Kremer, Jr. ............. F23G 7/066
423/245.3

* cited by examiner

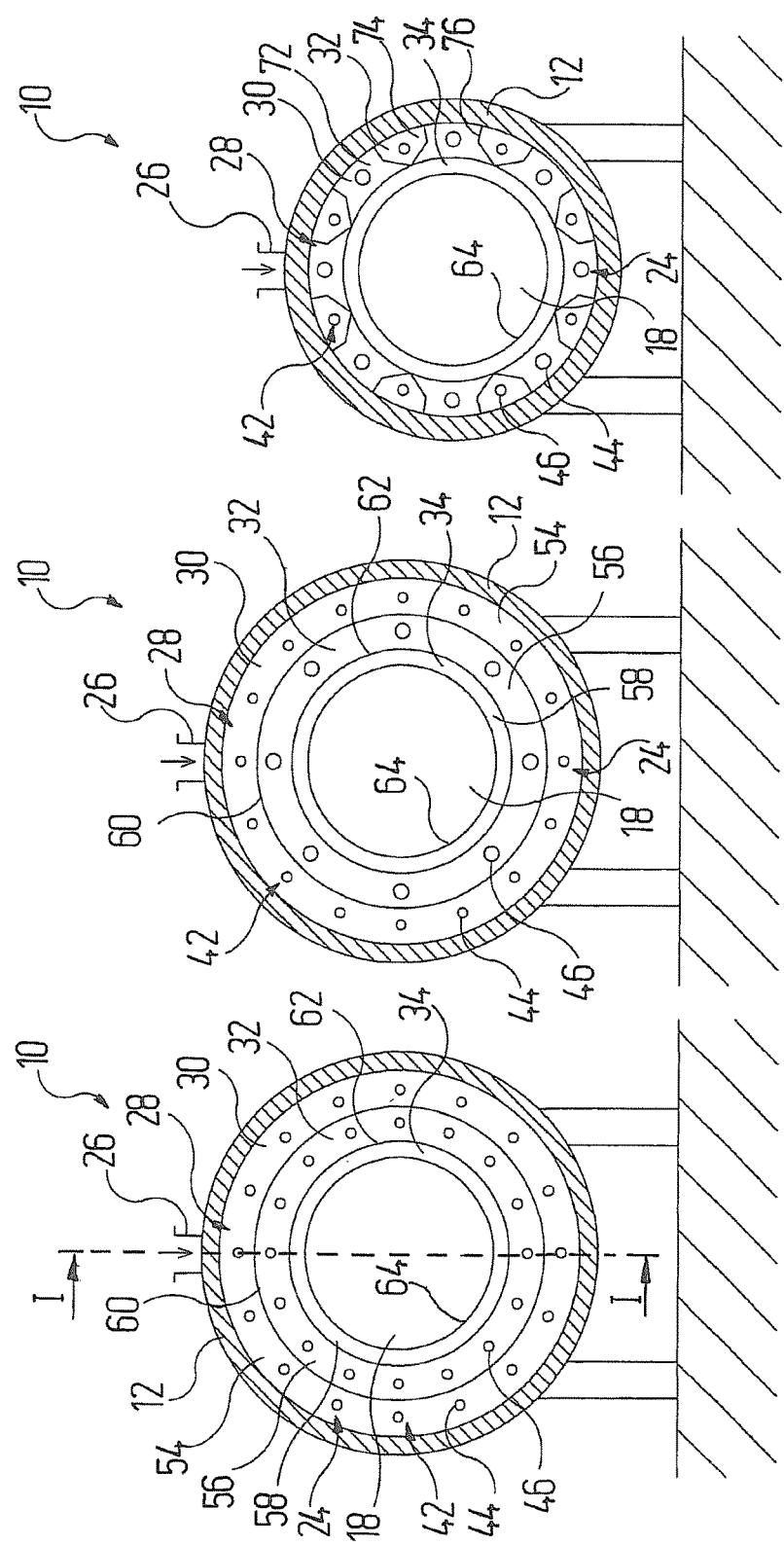

THERMAL POST-COMBUSTION UNIT

RELATED APPLICATIONS

This application claims the filing benefit of German Patent Application No. 10 2014 018 178.2, filed Dec. 9, 2014, the contents of which are incorporated herein by reference.

FIELD OF THE INVENTION

The invention relates to a thermal post-combustion unit having a) a combustion chamber which in turn comprises:
  aa) a combustion space to which exhaust air can be supplied;
  ab) a burner by means of which the combustion space can be heated, whereby clean air is produced;
  ac) an inlet for exhaust air;
  ad) an outlet for clean air;
b) a flow path which connects the inlet to the combustion space;
c) a heat exchanger system, to which at least some of the generated and hot clean air can be supplied and by means of which exhaust air which flows through the flow path can be heated.

BACKGROUND OF THE INVENTION

Thermal post-combustion units of this type are commercially known and are used in particular in processes which produce exhaust air, which contains volatile organic components (abbreviated as VOC). This exhaust air is cleaned by thermal post-combustion, in which the exhaust air is heated in the combustion space and the impurities are oxidised.

With regard to the energy balance of the unit and the effectiveness of the combustion, it has been established here that the exhaust air should be pre-heated on its flow path to the combustion chamber.

SUMMARY OF THE INVENTION

An object of the invention is now to improve a unit of the type mentioned at the outset.

This object may be achieved in a unit of the type mentioned at the outset in that d) the flow path comprises a first, second and third flow section, wherein the first flow section is connected to the inlet and the exhaust air flows from the third flow section further to the combustion space, wherein the flow sections are connected to one another at diversion ends in such a way that the exhaust air flows through two successive flow sections with different flow directions;

wherein e) heat-exchanger pipes extend at least inside the first and the second flow section or
f) at least the first and the second flow section extend inside heat-exchanger pipes.

It is thus possible for the flow path to extend in a virtually serpentine fashion, thereby increasing the useful path lengths along which heat transfer to the exhaust air can take place without needing to increase the longitudinal extent of the unit for this. As a result of the flow sections and the heat-exchanger pipes always nesting inside one another, the heat transfer in the first and the second flow section takes place more efficiently.

It is favourable if one, two or all of the flow sections are formed by annular spaces which surround the combustion space radially.

There are then preferably at least two annular spaces, which are arranged radially adjacent and between which there is an intermediate wall. As a result, the annular spaces are as closely adjacent as possible in the radial direction, which complies with the desire for a low spatial requirement of the unit in the radial direction.

In an advantageous alternative design, at least the first and the second flow section are formed by flow channels which are arranged alternately next to one another, are separated by chamber walls in the longitudinal direction of the housing and surround the combustion space radially. Instead of being arranged next to one another in the radial direction, the flow sections here are therefore arranged adjacently in the circumferential direction.

The number and/or the diameter and/or the design of the heat-exchanger pipes in the first flow section and the heat-exchanger pipes in the second flow section are generally the same. To enable a certain degree of influence on the flow conditions and the heat transfer, it can be favourable if the number and/or the diameter and/or the design of the heat-exchanger pipes in the first flow section and the heat-exchanger pipes in the second flow section are different. It is possible to set different flow rates in the individual flow sections through the number and the cross-sections of the heat-exchanger pipes. This likewise influences the heat transfer between the media.

To heat the exhaust air even more effectively, in particular at the start of its flow path, the heat-exchanger system can advantageously comprise an annular heat-exchanger space, which has an inlet connection and an outlet connection, which radially surrounds the first flow section externally and which can be supplied with a heat-exchanger medium which is different from the clean air.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

Exemplary embodiments of the invention are explained in more detail below with reference to the drawings, which show:

FIG. 2 a cross-section of the thermal post-combustion unit of FIG. 1 along the section line II-II therein;

FIG. 3 a cross-section corresponding to FIG. 2 of a thermal post-combustion unit according to a second exemplary embodiment;

FIG. 4 a cross-section corresponding to FIGS. 2 and 3 of a thermal post-combustion unit according to a third exemplary embodiment;

DETAILED DESCRIPTION OF THE PRESENT INVENTION

Figure 1:
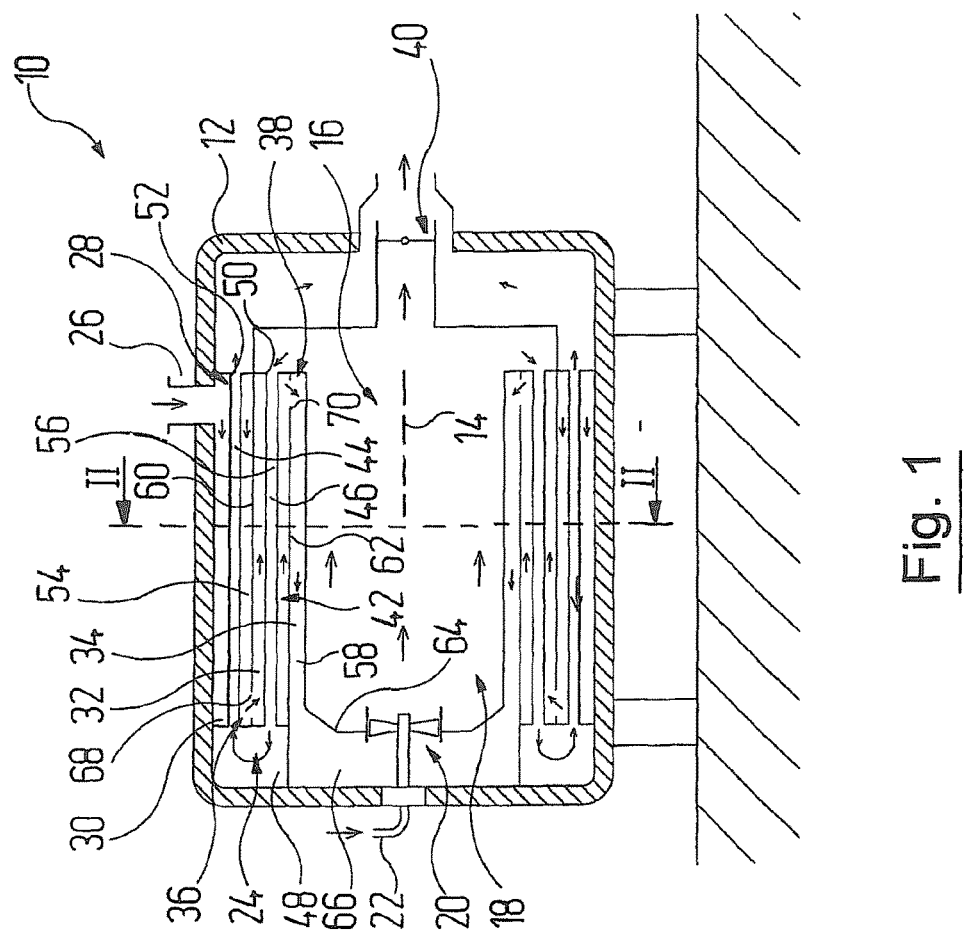
FIG. 1 a longitudinal section of a thermal post-combustion unit according to a first exemplary embodiment along the section line I-I of FIG. 2.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Reference is firstly made to FIGS. 1 and 2; these show a schematic view of a thermal post-combustion unit 10 with an external housing 12 which defines a longitudinal axis 14 and in which a combustion chamber 16 with a combustion space 18 is accommodated.

The combustion space 18 or the atmosphere located therein can be heated to a specific temperature with the aid of a burner 20. To this end, the burner 20 is supplied with a fuel gas or a fluid fuel by way of a fuel line 22.

The combustion space 18 is supplied with exhaust air, which is laden with contaminants and is to undergo cleaning, by way of a channel system 24 which is connected to an inlet 26 on the external housing 12. The channel system 24 comprises a flow path 28 which connects the inlet 26 to the combustion space 18. In the present exemplary embodiment, this flow path 28 comprises three flow sections 30, 32 and 34, through which the exhaust air flows with a different flow direction. The first flow section 30 extends from the inlet 26 to a first diversion end 36, which connects the first flow section 30 to the second flow section 32. The second flow section 32 extends from the first diversion end 36 to a second diversion end 38 which in turn connects the second flow section 32 to the third flow section 34. The exhaust air then flows from the third flow section 34 further to the combustion space 18. The third flow section 34 here can lead directly into the combustion space 18 or further sections of the flow path 28 can follow.

The flow sections 30, 32, 34 are connected to one another by way of the diversion ends 36, 38 in such a way that the exhaust air flows through two successive flow sections 30 and 32 or 32 and 34 with different flow directions. The flow directions in two adjacent flow sections 30, 32 or 32, 34 are opposed in the present exemplary embodiments and are illustrated in each case by arrows.

The supplied exhaust air is heated in the combustion chamber 18, whereby contaminants contained therein are burned and clean air is produced. The clean air can then flow out of the combustion chamber 16 through an outlet 40 whereof the flow cross-section can be adjusted by a flap which is not provided specifically with a reference numeral.

A heat-exchanger system 42 is present, to which at least some of the generated and hot clean air can be supplied as a heat-exchanger medium and through which at least exhaust air, which flows through the first and the second flow section 30 and 32, can be heated.

To this end, heat-exchanger pipes 44 extend in the first flow section 30 for the exhaust air and heat-exchanger pipes 46 extend in the second flow section 32 for the exhaust air, which heat-exchanger pipes have clean air flowing through them and exhaust air, which flows through the respective flow sections 30, 32, flowing over them so that heat from the clean air is transferred to the exhaust air. In FIGS. 2 to 4, only one of the respective heat-exchanger pipes 44, 46 is provided with a reference numeral in each case.

In this case, the walls of the heat-exchanger pipes 44, 46 therefore form a heat-exchanger surface for exhaust air and the hot clean air flows over their radial interior surface in the axial direction. In a modification which is not shown specifically, the conditions can also be reversed and the first flow section 30 can extend inside a first heat-exchanger pipe and the second flow section 32 can extend inside a second heat-exchanger pipe. In this variant, the respective wall of the flow sections 30, 32 forms a heat-exchanger surface for exhaust air and clean air flows over its radial exterior surface.

With reference to the flow directions of the exhaust air in the flow sections 30, 32 and the clean air in the heat-exchanger pipes 44, 46, the heat-exchanger system 42 operates in accordance with the counter-flow principle so that clean air flows through the heat-exchanger pipes 44, 46 in the opposite direction to the flow direction of the exhaust air in the respective flow section 30, 32. To this end, the heat-exchanger pipes 44, 46 are connected to one another by a diversion channel 48. The heat-exchanger pipes 44, 46 can alternatively be connected to one another by curved pipe pieces.

The clean air is supplied to the heat-exchanger pipes 44, 46 through a respective heat-exchanger inlet 50 located at the second diversion end 38. The heat-exchanger pipes 46 lead into a respective heat-exchanger outlet 52 which is located at the height of the inlet 26 as seen in the longitudinal direction.

In the exemplary embodiment shown in FIGS. 1 and 2, the flow sections 30, 32, 34 are formed by annular spaces 54, 56 and 58 which are adjacent in the radial direction and surround the combustion space 18 radially. The annular spaces 54, 56, 58 are closed at the end faces. The first annular space 54 is radially delimited on the outside by the housing 1.

An intermediate wall 60 is present between the first annular space 54 and the second annular space 56. A further intermediate wall 62 is present between the second annular space 56 and the third annular space 58. The third annular space 58 is radially delimited on the inside by a section of a combustion-space wall 64 and leads into a supply space 66 which leads to the combustion space 18.

Near the first diversion end 36 in the circumferential direction, the intermediate wall 60 has a number of through openings 68 which connect the first annular space 54 to the second annular space 56. In corresponding manner, near the second diversion end 38 in the circumferential direction, the further intermediate wall 62 has a number of through openings 70 which connect the second annular space 56 to the third annular space 58.

As shown in FIG. 2, the heat-exchanger pipes 44 extend through the first annular space 54 and are arranged in a regular distribution in the circumferential direction. The heat-exchanger pipes 46 extend through the second annular space 56 in corresponding manner.

When the exhaust air now flows through the three flow sections 30, 32 and 34 on its path to the combustion chamber 18, it is heated in stages since the freshly generated clean air with the highest temperature flows into the heat-exchanger pipes 46 in the second annular space 56 and cools on the path to the heat-exchanger pipe 44 in the first annular space 54 and through this heat-exchanger pipe, so that the clean air exits the heat-exchanger system 42 at the heat-exchanger outlets 52 with the lowest temperature.

The exhaust air flowing into the flow path 32 is therefore firstly heated by the coolest clean air in the heat-exchanger system 42 and absorbs the heat from continuously hotter clean air on the further flow path 32 so that the exhaust air arrives at the combustion chamber 18 with the highest temperature.

In the exemplary embodiment according to FIGS. 1 and 2, the heat-exchanger pipes 44 in the first annular space 54 and the heat-exchanger pipes 46 in the second annular space 56 are identical in terms of their diameter, their dimensions and their arrangement.

In a second exemplary embodiment shown in FIG. 2, there are fewer heat-exchanger pipes 46 in the second annular space 56 than there are heat-exchanger pipes 44 in the first annular space 54. With this, the diameters of the heat-exchanger pipes 46 in the second annular space 56 are greater than the diameters of the heat-exchanger pipes 44 in the first annular space 54.

However, this can be adapted in such a way that the flow and heat-transfer parameters in the two annular spaces 54, 56 correspond to one another.

In general terms, the number and/or the diameter and/or the design of the heat-exchanger pipes 44 in the first flow section 30 and the heat-exchanger pipes 46 in the second flow section 32 can be different. Different designs relate to all structural properties of the heat-exchanger pipes, such as different wall thicknesses of the pipes, the materials used for pipes and the geometrical structure of the pipe walls and the like.

FIG. 4 shows a third exemplary embodiment, in which the first and the second flow section 30, 32 are constructed not as annular spaces but as flow channels 72, 74, which are arranged alternately next to one another in the circumferential direction, are separated by chamber walls 76 in the longitudinal direction of the housing 12 and surround the combustion space 18 radially. In this arrangement, the flow channels 72 define the first flow section 30 and the flow channels 74 define the second flow section 32. A heat-exchanger pipe 44 extends in each flow channel 72 and a heat-exchanger pipe 46 extends in each flow channel 74.

In the present exemplary embodiment, the flow channels 72 have a larger cross-section than the flow channels 74. So that, in such a case, the flow and heat-transfer parameters remain unaltered from those with the same channel cross-sections, the heat-exchanger pipes 44 in the flow channels 72 have a greater cross-section than the heat-exchanger pipes 46 in the flow channels 74.

Figure 5:
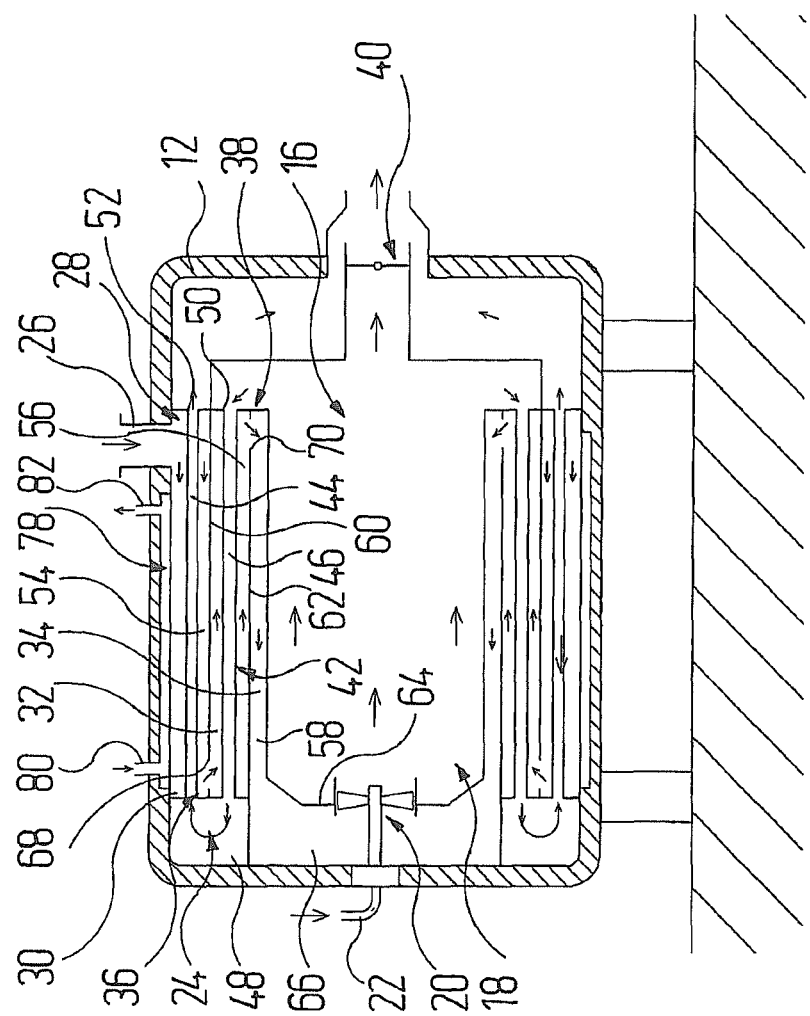
FIG. 5 a longitudinal section corresponding to FIG. 1 of a thermal post-combustion unit according to a fourth exemplary embodiment.

FIG. 5 shows a fourth exemplary embodiment of a thermal post-combustion unit 10, which corresponds substantially to the post-combustion unit 10 according to the first exemplary embodiment according to FIGS. 1 and 2. Additionally, the heat-exchanger system 42 therein has a heat-exchanger annular space 78, which has an inlet connection 80 and an outlet connection 82, which radially surrounds the first flow section 30, here in the form of the annular space 54, externally and which can be supplied with a heat-exchanger medium which is different from the clean air.

It is thus possible for the outer jacket of the housing 12 to be cooled more effectively to reach lower surface temperatures in the insulated outer surface of the unit 10. If the outlet connection 82 is structurally and fluidically connected to the exhaust-air inlet 26, the heat-exchanger annular space 78 can function as a cooling jacket through which exhaust air flows. In this, as the exhaust air serves as a heat-exchanger medium which is different from the clean air.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A thermal post-combustion unit comprising:
  a) a combustion chamber which comprises
    aa) a combustion space to which exhaust air can be supplied;
    ab) a burner for heating the combustion space producing hot clean air;
    ac) an inlet for exhaust air; and
    ad) an outlet for clean air;
  b) a flow path which connects the inlet to the combustion space;
  c) a heat exchanger system, the heat exchanger system being supplied with at least a portion of the hot clean air for use as a heat exchanger medium for heating exhaust air which flows through the flow path, wherein the heat exchanger system includes at least two heat-exchanger pipes, the heat exchanger pipes are connected by a diversion channel which bends the flow path of the heat exchanger medium 180°;
  wherein
  d) the flow path comprises a first, a second and a third flow section, wherein the first flow section is connected to the inlet, the second flow section is connected between the first flow section and the third flow section, and the exhaust air flows from the third flow section to the combustion space, wherein the flow sections are connected to one another at diversion ends which bend the flow path 180° so that the exhaust air flows through each successive flow section in an opposite flow direction of the previous flow section;
  wherein
  e) the at least two heat-exchanger pipes extend at least inside the first and the second flow section
  or
  f) at least the first and the second flow section extend inside the at least two heat-exchanger pipes.

2. The thermal post-combustion unit according to claim 1, wherein one or more of the first, second, and third flow sections are formed by an annular space which radially surrounds the combustion space.

3. The thermal post-combustion unit according to claim 2, wherein there are at least two annular spaces which are arranged radially adjacent and separated by an intermediate wall.

4. The thermal post-combustion unit according to claim 1, wherein at least the first and the second flow section are formed by flow channels which
  are arranged alternately next to one another,
  are separated by chamber walls in a longitudinal direction of the housing, and surround the combustion space radially.

5. The thermal post-combustion unit according to claim 1, wherein the first flow section differs from the second flow section with respect to at least one of
  the number of heat exchanger pipes,
  the diameter of the heat exchanger pipes, or
  the design of the heat-exchanger pipes.

6. The thermal post-combustion unit according to claim 1, wherein the heat-exchanger system comprises a heat-exchanger annular space which has an inlet connection and an outlet connection, the heat-exchanger annular space radially surrounding an exterior of the first flow section and being supplied with a heat-exchanger medium which is different from the hot clean air.

7. The thermal post-combustion unit according to claim 1, wherein the direction of flow of the heat exchanger medium is opposite of the flow direction of the exhaust air.

8. A thermal post-combustion unit comprising:
  a) a combustion chamber which comprises aa) a combustion space to which exhaust air can be supplied;

ab) a burner for heating the combustion space producing hot clean air;

ac) an inlet for exhaust air; and ad) an outlet for clean air;

b) a flow path which connects the inlet to the combustion space, the flow path comprising a first, a second and a third flow section, wherein the first flow section is connected to the inlet, the second flow section is connected between the first flow section and the third flow section, and the exhaust air flows from the third flow section to the combustion space, wherein the flow sections are connected to one another at diversion ends so that the exhaust air flows through each successive flow section in an opposite flow direction of the previous flow section;

c) a heat exchanger system, the heat exchanger system being supplied with at least a portion of the hot clean air for use as a heat exchanger medium for heating exhaust air which flows through the flow path, wherein the heat exchanger system includes at least two heat-exchanger pipes, the heat exchanger pipes are connected by a diversion channel which bends the flow path of the heat exchanger medium so that the heat exchanger medium flows in an opposite direction in each of the at least two heat exchanger pipes;

wherein e) the at least two heat-exchanger pipes extend at least inside the first and the second flow section or f) at least the first and the second flow section extend inside the at least two heat-exchanger pipes.

* * * * *